(12) United States Patent
Phillips et al.

(10) Patent No.: US 7,861,931 B2
(45) Date of Patent: Jan. 4, 2011

(54) METHOD, APPARATUS, ASSEMBLY AND KIT FOR IDENTIFICATION TOKEN

(75) Inventors: Simon Phillips, York (GB); Barry Roy Mosteller, Downingtown, PA (US)

(73) Assignee: MasterCard International, Inc., Purchase, NY (US)

( * ) Notice: Subject to any disclaimer, the term of this patent is extended or adjusted under 35 U.S.C. 154(b) by 440 days.

(21) Appl. No.: 11/935,750

(22) Filed: Nov. 6, 2007

(65) Prior Publication Data

US 2008/0121707 A1 May 29, 2008

Related U.S. Application Data

(60) Provisional application No. 60/857,009, filed on Nov. 6, 2006.

(51) Int. Cl.
*G08B 13/14* (2006.01)
*G06K 7/00* (2006.01)
*G06K 7/08* (2006.01)
*G06K 19/00* (2006.01)
*G06K 19/06* (2006.01)

(52) U.S. Cl. .................. 235/435; 235/451; 235/487; 235/492; 235/450; 340/572.8

(58) Field of Classification Search .............. 235/451, 235/450, 487, 492, 435; 340/572.8, 5.61, 340/5.64, 5.65, 10.1, 10.42, 10.52
See application file for complete search history.

(56) References Cited

U.S. PATENT DOCUMENTS

| | | | | |
|---|---|---|---|---|
| 4,562,342 A * | 12/1985 | Solo | ............ | 235/380 |
| 5,570,081 A * | 10/1996 | Holstrom | ............ | 340/573.3 |
| 5,769,457 A * | 6/1998 | Warther | ............ | 283/61 |
| 5,975,584 A * | 11/1999 | Vogt | ............ | 283/98 |
| 6,002,605 A * | 12/1999 | Iwasaki et al. | ............ | 365/51 |
| 6,193,163 B1 * | 2/2001 | Fehrman et al. | ............ | 235/488 |
| 6,199,757 B1 * | 3/2001 | Kubert | ............ | 235/380 |
| 6,315,205 B1 * | 11/2001 | Bates, III | ............ | 235/479 |
| D454,910 S * | 3/2002 | Smith et al. | ............ | D19/9 |
| 6,419,158 B2 * | 7/2002 | Hooglander | ............ | 235/492 |
| 6,447,140 B1 * | 9/2002 | Lu | ............ | 362/109 |
| 6,543,809 B1 * | 4/2003 | Kistner et al. | ............ | 283/57 |
| 6,561,432 B1 * | 5/2003 | Vedder et al. | ............ | 235/492 |
| 6,594,154 B1 * | 7/2003 | Brewer et al. | ............ | 361/801 |
| 6,641,049 B2 * | 11/2003 | Luu | ............ | 235/492 |
| 6,722,571 B1 * | 4/2004 | Lavrut et al. | ............ | 235/492 |
| 6,769,718 B1 * | 8/2004 | Warther et al. | ............ | 283/61 |
| 6,817,534 B2 * | 11/2004 | Gray | ............ | 235/492 |
| 6,964,377 B1 * | 11/2005 | Haghiri et al. | ............ | 235/492 |
| 7,000,844 B1 * | 2/2006 | Smith | ............ | 235/487 |
| 7,065,195 B1 * | 6/2006 | Smith et al. | ............ | 379/144.01 |
| 7,183,636 B1 * | 2/2007 | Boccia et al. | ............ | 257/679 |
| 7,188,762 B2 * | 3/2007 | Goade et al. | ............ | 235/380 |
| 7,267,284 B1 * | 9/2007 | Smith | ............ | 235/487 |
| D561,252 S * | 2/2008 | Phillips et al. | ............ | D19/10 |

(Continued)

*Primary Examiner*—Daniel Walsh
(74) *Attorney, Agent, or Firm*—Buckley, Maschoff & Talwalkar LLC (57) ABSTRACT

In some embodiments, an identification token assembly includes: a card-shaped plastic body having a scored line formed therein, the plastic body including a subcard body, the scored line adapted to allow the subcard body to be detached from the plastic body; a radio frequency identification (RFID) integrated circuit (IC) supported by the subeard body; and an antenna supported by the subeard body and coupled to the RFID IC to transmit a signal generated by the RFID IC.

5 Claims, 9 Drawing Sheets

U.S. PATENT DOCUMENTS

| | | | |
|---|---|---|---|
| 7,438,224 B1 * | 10/2008 | Jensen et al. | 235/380 |
| D582,474 S * | 12/2008 | Phillips et al. | D19/10 |
| 7,559,469 B2 * | 7/2009 | Noda et al. | 235/441 |
| 7,604,176 B2 * | 10/2009 | Bates et al. | 235/486 |
| 2001/0022301 A1 * | 9/2001 | O'Donnell | 220/3.92 |
| 2002/0008610 A1 * | 1/2002 | Peterson | 340/5.64 |
| 2002/0185855 A1 * | 12/2002 | Klure | 283/62 |
| 2003/0022537 A1 * | 1/2003 | Bricaud et al. | 439/152 |
| 2003/0085288 A1 * | 5/2003 | Luu | 235/492 |
| 2004/0129785 A1 * | 7/2004 | Luu | 235/486 |
| 2004/0223305 A1 * | 11/2004 | Amiot et al. | 361/737 |
| 2005/0023359 A1 * | 2/2005 | Saunders | 235/492 |
| 2005/0045732 A1 * | 3/2005 | Whitaker | 235/493 |
| 2005/0247798 A1 * | 11/2005 | Graves et al. | 235/493 |
| 2006/0006225 A1 * | 1/2006 | Goade et al. | 235/380 |
| 2006/0037502 A1 * | 2/2006 | Warther | 101/232 |
| 2006/0118639 A1 * | 6/2006 | Kean et al. | 235/492 |
| 2007/0039687 A1 * | 2/2007 | Hamilton et al. | 156/264 |
| 2007/0063052 A1 * | 3/2007 | Chakiris et al. | 235/486 |
| 2007/0115129 A1 * | 5/2007 | Kessler | 340/572.3 |
| 2007/0145150 A1 * | 6/2007 | Barczyk et al. | 235/492 |
| 2007/0176007 A1 * | 8/2007 | Priya et al. | 235/492 |
| 2007/0251994 A1 * | 11/2007 | Kingsborough et al. | 235/380 |
| 2007/0278293 A1 * | 12/2007 | Anderson et al. | 235/380 |
| 2008/0068181 A1 * | 3/2008 | Phillips | 340/572.8 |
| 2008/0190784 A1 * | 8/2008 | Phillips | 206/39 |
| 2008/0245856 A1 * | 10/2008 | Jensen et al. | 235/380 |
| 2008/0251968 A1 * | 10/2008 | Misner et al. | 264/272.15 |
| 2009/0045963 A1 * | 2/2009 | Vigneron et al. | 340/572.8 |
| 2009/0195364 A1 * | 8/2009 | Edwards et al. | 340/10.5 |

* cited by examiner

METHOD, APPARATUS, ASSEMBLY AND KIT FOR IDENTIFICATION TOKEN

CROSS REFERENCE TO RELATED APPLICATION

This application claims priority under 35 U.S.C. §119 to U.S. Provisional Patent Application Ser. No. 60/857,009, entitled "PROXIMITY PAYMENT DEVICE ASSEMBLIES", filed in the name of Simon Phillips et al. on Nov. 6, 2006, the contents of which are hereby incorporated by reference.

BACKGROUND

Proximity payment cards are in widespread use. A well known standard for such cards has been promulgated by MasterCard International Incorporated, the assignee hereof, and is referred to as "PayPass". Proximity payment cards typically include a radio frequency identification (RFID) integrated circuit (IC) embedded in a card-shaped plastic body. An antenna is also embedded in the card body. The antenna allows the card to receive a power signal from a point of sale terminal. The antenna is also used by the RFID IC to transmit the payment card account number, and possibly other information as well, to the POS terminal.

In the process of manufacture and distribution of proximity payment cards, there is a step referred to as "personalization". In the personalization step, a payment account number, and possibly other information such as the prospective cardholder's name, are stored in the RFID IC of a proximity payment card blank. Personalization may also include printing the payment card account number, the cardholder's name, and possibly other information on the face and/or back of the card blank.

Because proximity payment cards are issued in large numbers, automated equipment has been developed to personalize sizable batches of proximity payment cards. The automated equipment is typically designed to handle and process standard-sized card blanks which meet the well-known ID-1 standard in terms of dimensions and in other respects.

Some holders of payment card accounts may find it convenient to carry a proximity payment device that is smaller than a standard sized payment card, and issuers of proximity payment cards are moving to issue such smaller devices. It has been proposed, for example, to issue proximity payment devices that are small enough to be conveniently carried on key rings. However, the widely used automatic personalization equipment cannot readily handle and process the proposed small proximity payment devices without expensive redesigns of the equipment.

DETAILED DESCRIPTION

Figure 1:
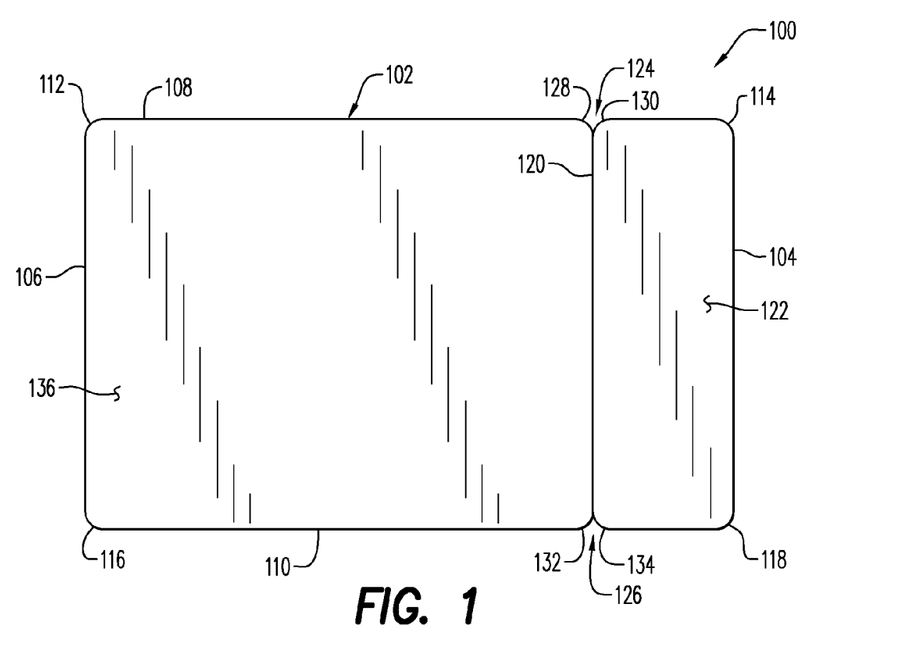
FIG. 1 is a top plan view of a proximity payment device assembly according to some embodiments.

FIG. 1 is a top plan view of a proximity payment device assembly 100 according to some embodiments.

The proximity payment device assembly 100 includes a generally rectangular card-shaped plastic body 102. In some embodiments, the plastic body 102 may be formed of any material conventionally used to make payment cards, identity cards, proximity payment devices, etc.

The plastic body 102 has a right edge 104, a left edge 106, a top edge 108 and a bottom edge 110. The right edge 104 is parallel to the left edge 106. The top edge 108 is parallel to the bottom edge 110. The top edge 108 and the bottom edge 110 are generally perpendicular to the left edge 106 and the right edge 104. The plastic body 102 has a height dimension measured as the shortest distance from the top edge 108 to the bottom edge 110. The plastic body 102 also has a length dimension measured as the shortest distance from the left edge 106 to the right edge 104. The dimensions of the plastic body 102 may generally be in keeping with the dimensions prescribed for the ID-1 standard card, so that the length dimension may be substantially 85.6 mm and the height dimension may be substantially 54 mm.

The plastic body 102 also has a top left rounded corner 112 which joins the top edge 108 and the left edge 106, a top right rounded corner 114 which joins the top edge 108 and the right edge 104, a bottom left rounded corner 116 which joins the bottom edge 110 and the left edge 106, and a bottom right rounded corner 118 which joins the bottom edge 110 and the right edge 104.

The plastic body 102 also has scoring that includes a scored line 120 which defines a subcard body 122 as a portion of the plastic body 102. (In this embodiment, the subcard body is further defined by the right edge 104, the portion of the top edge 108 to the right of the scored line 120 and the portion of the bottom edge 110 to the right of the scored line 120.) The scored line 120 is oriented parallel to the right edge 104 and the left edge 106 and may be spaced from the right edge 104 by a short distance such as 18 mm or any other convenient distance for defining a width dimension of the subcard body 122. The scored line 120 is adapted and configured to allow the subcard body 122 to be readily snapped off from the plastic body 102 by manual action of a human being such as the account holder.

The plastic body 102 also has a notch 124 formed as a void in the top edge 108 at the locus of the scored line 120. In addition, the plastic body 102 has a notch 126 formed as a void in the bottom edge 110 at the locus of the scored line 120. The notch 124 is defined between convex quarter-circle radii 128, 130, and the notch 126 is defined between convex quarter-circle radii 132, 134. The scored line 120 extends and reaches all the way across the height dimension of the plastic body 102 from the notch 124 to the notch 126.

As a result of the presence of the notches 124, 126 at the scored line 120, the subcard body 122, upon being snapped off from the plastic body 102, will have four rounded corners, including corners respectively defined by radii 130, 134 in addition to the above-mentioned corners 114, 118. Moreover, after the subcard body 122 is snapped off from the plastic body 102, the resulting stub 136 will also have four rounded corners, including corners respectively defined by radii 128, 132 in addition to the above-mentioned corners 112, 112. Thus a subcard with rounded corners is provided without leaving a stub that has any sharp points at locations from which the subcard corners are removed.

It will also be appreciated that the subcard body 122 has the same height dimension (in this embodiment 54 mm) as the plastic body 102. In this embodiment the subcard body 122 has a width dimension of 18 mm, but may alternatively have other dimensions.

The plastic body 102 may have a substantially uniform thickness, except at the scored line 120. The substantially uniform thickness may, for example, be about 0.76 mm, in accordance with the ID-1 standard.

Figure 2:
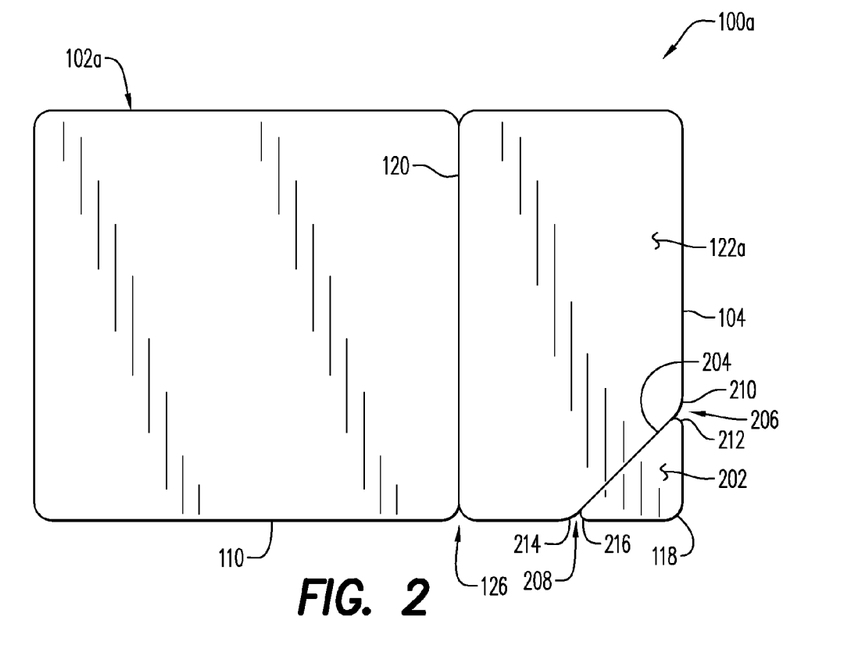
FIG. 2 is a top plan view of a proximity payment device assembly according to some other embodiments.

FIG. 2 is a top plan view of a proximity payment device assembly 100a according to some other embodiments. The proximity payment device assembly 100a has essentially all of the features discussed above in connection with the proximity payment device assembly 100 of FIG. 1. The two chief differences between the embodiment shown in FIG. 2 and that of FIG. 1 are that (a) the scored line 120 shown in FIG. 2 is more distant from right edge 104 of the plastic body 102a, say about 30 mm distant, to result in the subcard body 122a having a width dimension of about 30 mm, and (b) the subcard body 122a has a detachable corner 202 defined by a second scored line 204 formed in the subcard body 122a. The second scored line 204 is adapted and configured so that the detachable corner 202 may be easily snapped off from the subcard body 122a by manual action of a human being such as the account holder. The second scored line may be oriented at 45° from the right edge 104 and the bottom edge 110, although other orientations are possible.

To avoid sharp corners on either the detached corner 202 or on the subcard body 122a after removal of the corner 202, the plastic body 102a has a notch 206 formed as a void in the right edge 104 and a notch 208 formed as a void in the bottom edge 110 of the plastic body 102a. The notch 208 is located between the notch 126 and the bottom right corner 118 of the plastic body 102a, and thus is present in the subcard body 122a before the corner 202 is removed from the subcard body 122a. The notch 206 is defined between a convex radius 210 having an angular extent of about 45° and a convex radius 212 having an angular extent of about 135°. The notch 208 is defined between a convex radius 214 having an angular extent of about 45° and a convex radius 216 having an angular extent of about 135°. The scored line 204 extends so as to reach from notch 206 to notch 208.

By allowing the corner 202 of the subcard body 122a to be easily detached, the subcard body may be readily adapted to a shape suitable for being housed in a key ring fob-holder having a cavity for holding the subcard body and having a corner of the cavity cut off to allow passage of the key ring through the fob-holder.

Figure 3:
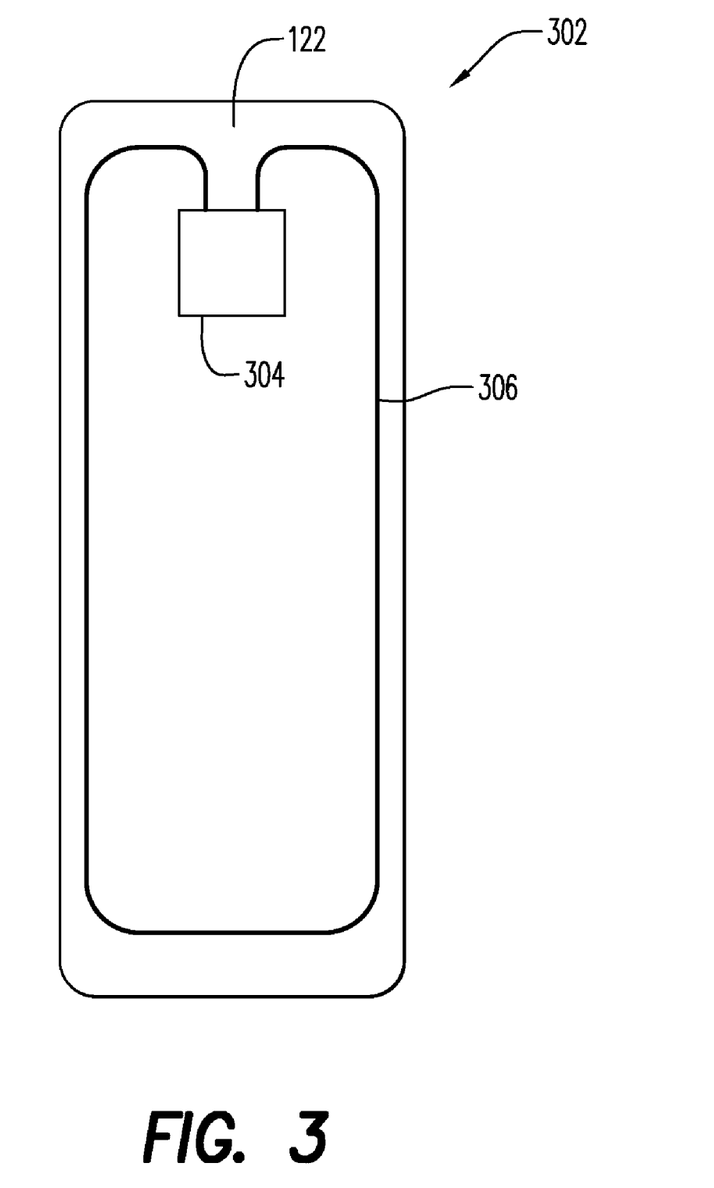
FIG. 3 is a schematic plan view of a proximity payment device after it has been snapped off from one of the assemblies of FIGS. 1 and 2, according to some embodiments.

FIG. 3 is a schematic plan view of a proximity payment device 302 after it has been snapped off from one of the assemblies 100, 100a of FIGS. 1 and 2, in accordance with some embodiments. The proximity payment device 302 may include the above-mentioned subcard body 122, which may support a radio frequency identification (RFID) integrated circuit (IC) 304 and an antenna 306. In some embodiments, the radio frequency identification (RFID) integrated circuit (IC) 304 and the antenna 306 are embedded in the subcard body 122.

The RFID IC 304 may include circuitry operative to store a payment account number and/or other information to be transmitted to a POS terminal. In some embodiments, the circuitry may be a simple memory device capable only of responding to a pre-defined set of commands. In some other embodiments, the circuitry may comprise a secure microcontroller capable of executing a pre-defined program.

The antenna 306 may be coupled to the RFID IC 304 to allow the RFID IC 304 to transmit one or more signals, including, for example, a payment account number stored in the RFID IC 304. In addition, the antenna 306 may allow the RFID IC 304 to receive signals such as interrogation/power signals, etc. The RFID IC 304 and the antenna 306 may be configured to allow the proximity payment device to operate, for example, in accordance with the above-mentioned "PayPass" standard. In some embodiments, the RFID IC 304 comprises an IC that uses contactless technology, such as, for example, that specified in the international standard ISO/IEC14443.

The subcard body may alternatively have the configuration illustrated in FIG. 2, with a corner removed, in which case the antenna 306 may be laid out in a manner so as to avoid the missing corner. Although the antenna is illustrated as having a single turn, it may in practice have several turns, e.g., 2-10 turns, or may be of a different type and/or configuration.

Other configurations may also be employed.

In some embodiments, the radii 128, 130 may define quarter circle or eighth circle radii instead of quarter circle radii and the notch may be defined between such quarter circle or eighth circle radii, respectively. In some embodiments, the subcard has rounded corners that define other radii.

In some embodiments the subcard body 122 may have any configuration with smooth corners. As used herein, smooth corners means corners that are not sharp, so that an account holder will not be cut by the subcard during handling of the subcard in the course of situations expected to arise and/or before, during and/or after detaching the subcard from the plastic body. In some embodiments, a smooth corner may be defined by a plurality of line segments, where each of the plurality of line segments has a slope that is only slightly different than that of adjacent one(s) of the plurality of line segments. In some embodiments, a smooth corner may be defined by a plurality of line segments, where the plurality of line segments are spaced apart from one another by rounded portions.

Figure 4:
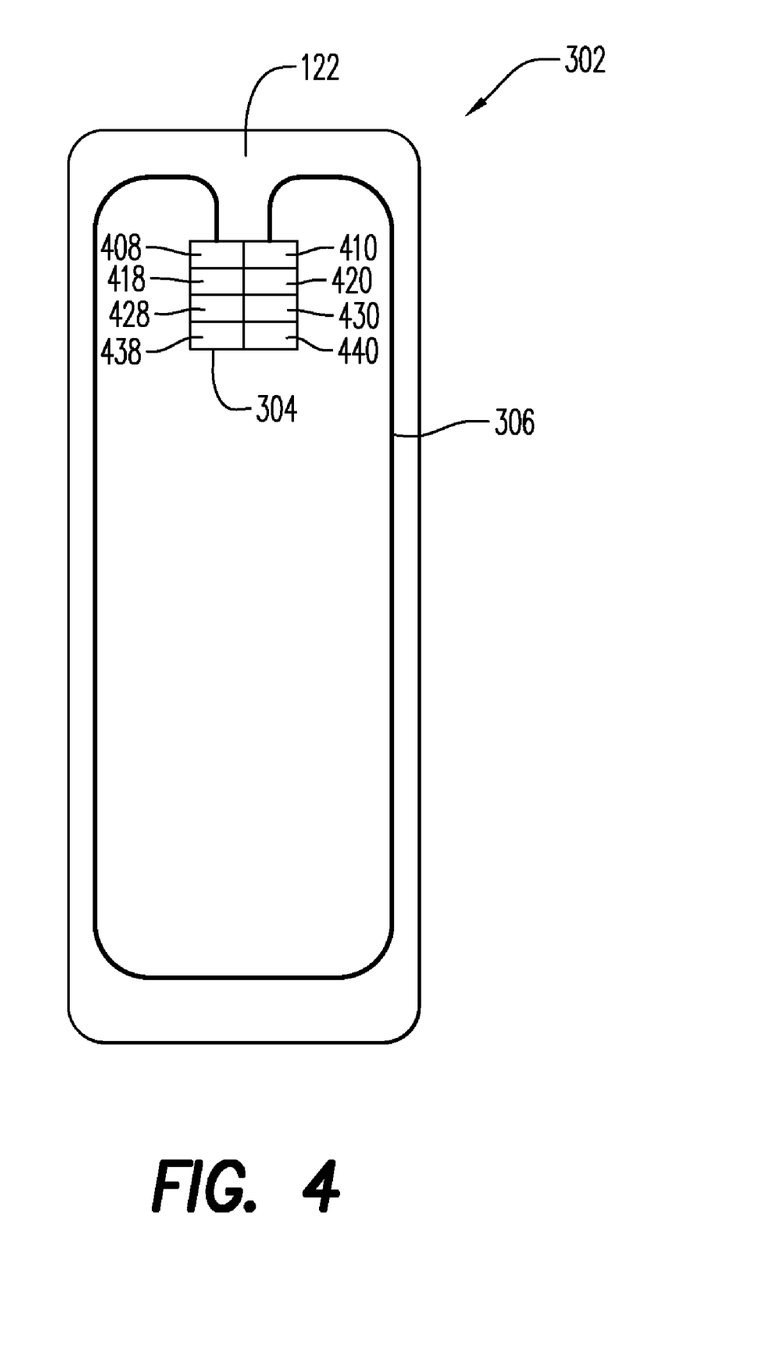
FIG. 4 is a schematic plan view of a proximity payment device after it has been snapped off from one of the assemblies of FIGS. 1 and 2, according to some embodiments.

FIG. 4 is a schematic plan view of a proximity payment device 302 after it has been snapped off from one of the assemblies 100, 100a of FIGS. 1 and 2, in accordance with some embodiments. Referring to FIG. 4, in some embodiments, the RFID IC 304 may include a plurality of contacts, e.g., contact pads 408-440. Two of the contacts, e.g., contact pads 408, 410, may be electrically connected to the antenna 306.

The subcard body 122 and/or the stub 136 (or what will be the stub 136 upon detaching of the subcard body 122) may have information printed and/or otherwise provided thereon. For example, in some embodiments, the payment account number (or a portion thereof), the account holder's name, a valid from date, an expiration date, a security code and/or other information may be printed and/or otherwise provided on the subcard body 122. In some embodiments, the information may include one or more instructions relating to use of the proximity payment device 302.

If only a portion of the payment account number is provided, such portion may include any number of characters disposed at any position(s) of the account number. In some embodiments, the portion of the payment card account number may include six digits at the beginning of the account number and/or six digits at the end of the account number. If the payment card account number has a BIN portion, the six digits at the beginning of the account number may correspond to such BIN portion. A placeholder may be provided in place of any portion or portions of the payment card account number that are not printed. In some embodiments, one or more X's, (and/or other character(s)) and/or one or more blank spaces may be used as a placeholder for any portions of the payment card account number that are not provided. In some embodiments, an X may be printed in place of each omitted character of the payment card account number.

In some embodiments, the information may include one or more logos and/or brands. In some embodiments, the one or more logos and/or brands may include (i) one or more brands and/or logos of one or more national and/or international payment card association such as for example, MasterCard International Incorporated (ii) one or more brands and/or logos of one or more products, such as, for example, Pay Pass, provided by one or more national payment card associations (iii) one or more brands and/or logos of one or more issuers and/or (iv) one or more brands and/or logos of one or more products provided by the one or more issuers. In some embodiments, the information, logos and/or brands may comprise embossed and/or non-embossed numbers and/or letters.

Other features that may be provided on the subcard body 122 (though such features are not shown) may include (i) a paper strip or other surface to receive a signature of the cardholder, (ii) a security code, which may be provided on the paper strip, if present, or/or another suitable location and/or (iii) a magnetic stripe (not shown), which may be read by a magnetic card reader and may store some or all of the information that was (or is to be) stored in the RFID IC 304. In some embodiments, adhesive may be used to attach a paper strip to the subcard body 122.

Figure 5A:
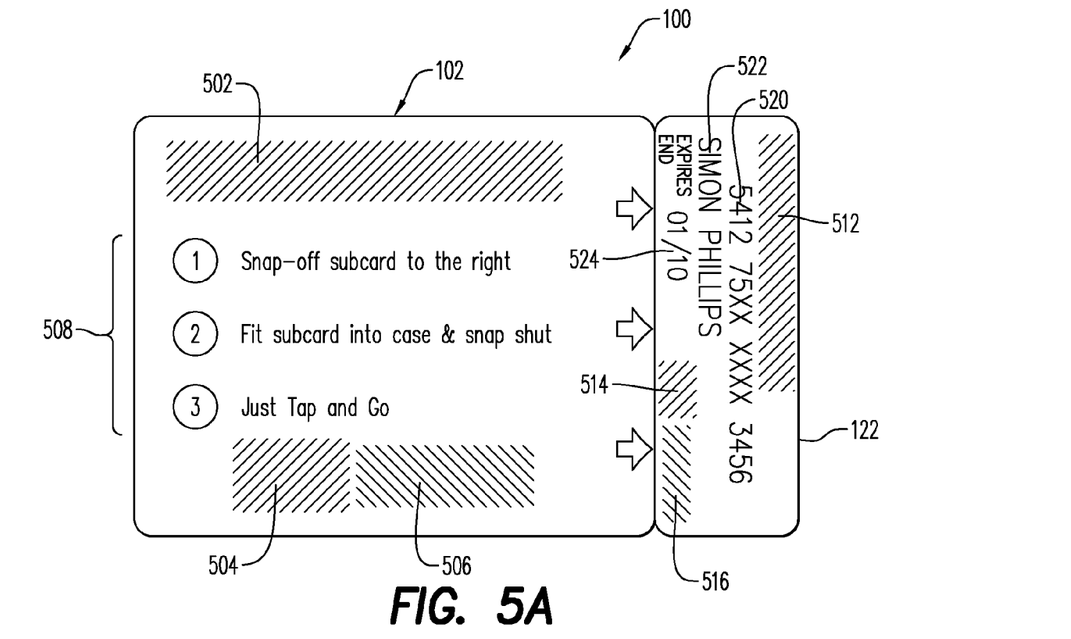
FIG. 5A is a schematic plan view of a proximity payment device assembly, according to some embodiments.

FIG. 5A is a schematic plan view of one embodiment of the proximity payment device assembly 100 before the subcard body 122 has been snapped off from the plastic body 102. Referring to FIG. 5A, in this embodiment, the plastic body 102 has regions 502, 504, 506 that may be provided with one or more brand and/or logo of an issuer or a payment card association and/or one or more brand and/or logo of a product provided by the issuer or payment card association. The plastic body 102 further includes one or more regions, e.g., a region 508, that include instructions and/or other information relating to use of the subcard body 122 and/or the proximity payment device 302. Such information may include arrows that point to the subcard body 122 and/or proximity payment card 302.

Also in this embodiment, the subcard body 122 has regions 512, 514, 516 that may be provided with one or more brand and/or logo of an issuer or a payment card association and/or one or more brand and/or logo of a product provided by the issuer or payment card association. The subcard body 122 is further provided with a portion of a payment account number 520, an account holder's name 522 and an expiration date 524. The portion of the payment account number 520 includes include six digits that define a first portion of the account number and four digits that define a second portion of the account number. For security, X's are provided in place of six digits of the payment account number. Other configurations may also be employed.

Figure 5B:
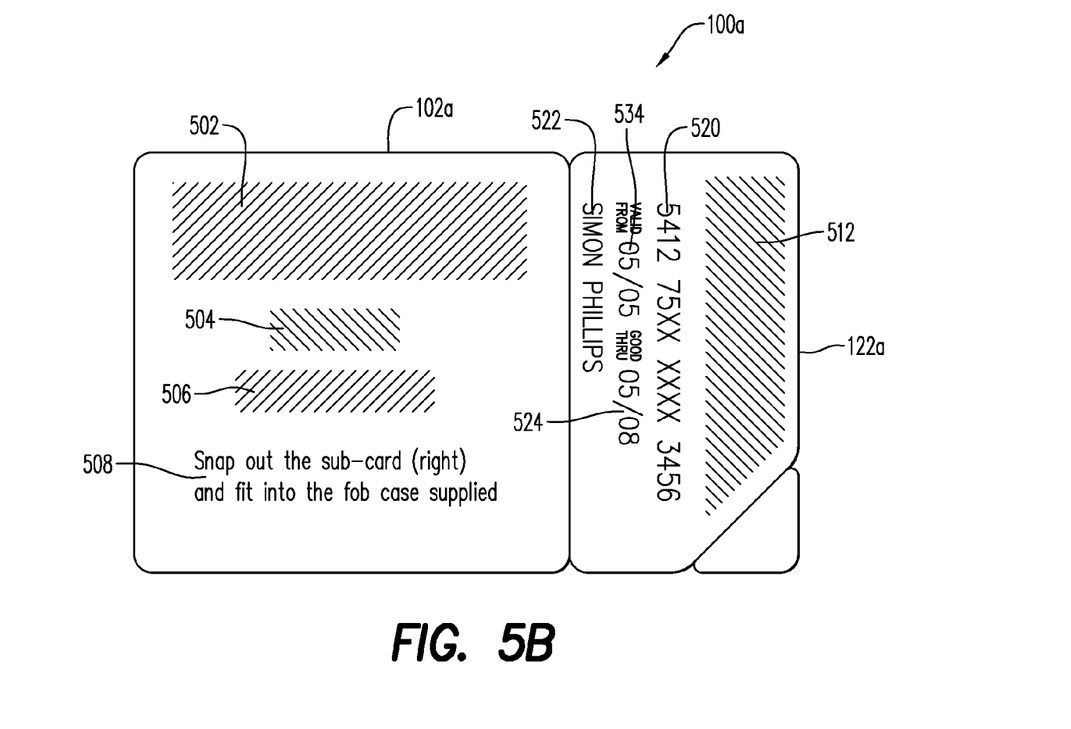
FIG. 5B is a schematic plan view of a proximity payment device assembly, according to some embodiments.

FIG. 5B is a schematic plan view of another embodiment of the proximity payment device assembly 100 before the subcard body 122 has been snapped off from the plastic body 102. Referring to FIG. 5B, in this embodiment, the plastic body 102 has regions 502, 504, 506 that may be provided with one or more brand and/or logo of an issuer or a payment card association and/or one or more brand and/or logo of a product provided by the issuer or payment card association. The plastic body 102 further includes one or more regions, e.g., a region 508, that include instructions and/or other information relating to use of the subcard body 122 and/or the proximity payment device 302.

Also in this embodiment, the subcard body 122 has regions 512, 514, 516 that may be provided with one or more brand and/or logo of an issuer or a payment card association and/or one or more brand and/or logo of a product provided by the issuer or payment card association. The subcard body 122 is further provided with a payment account number 520, an account holder's name 522 and a valid from date 534 and an expiration date 524. The payment account number 520 includes sixteen digits. Other configurations may also be employed.

Because the proximity payment card assemblies 100, 100a shown herein may have the same overall dimensions as are called for by the ID-1 standard, the proximity payment device embodied in the subcard body may be processed for the purposes of personalization and/or pre-personalization by standard automated personalization equipment prior to detaching the subcard body from the assembly.

Personalization refers to a process that may be used to assign the subcard to a particular payment account and/or a particular account holder by storing information in the subcard. In some embodiments, this may include writing a payment card account number and a name of the account holder into the RFID IC 304. Other information, such as expiration date, may be stored in either of the pre-personalization and personalization steps. In some embodiments, pre-personalization and personalization steps may be combined into one operation.

In some embodiments, pre-personalization may be used to prepare the RFID IC 304 for personalization. Pre-personalization may include storing information such as keys to be used in subsequent transactions and parameters to be used to select a particular card brand to be borne by the proximity payment device 302. In some embodiments, this may include writing information such as loading of keys to be used in subsequent transactions and parameters (such as to select a particular card brand to be borne by the proximity payment device 302) into the RFID IC 304.

Some embodiments may personalize and/or pre-personalize the proximity payment device 302 using wireless communication. In that regard, some embodiments may personalize and/or pre-personalize the subcard 122 using contactless card programming equipment commonly used to program proximity payment cards, such as for example, a model 9000 available from Datacard Group, Minnetonka, Minn.

Information such as a payment card association brand, etc., may be printed on the card and/or subcard as part of pre-personalization. In some embodiments, blanks are processed as a batch. The information transmitted to each card and/or sub/card and/or printed on each card and/or subcard may be the same for all blanks in the batch.

In accordance with some embodiments, the payment account number and/or any other information (or a portion thereof) that was (or is to be) stored in the RFID IC 304 may be printed on a surface of the subcard 122. In accordance with some embodiments, the printing of the payment account number and/or other information may be by use of the above-mentioned Datacard 9000 equipment or by another suitable device with printing capabilities.

In some embodiments, the proximity payment device 100 is personalized with a payment card account number (otherwise referred to as a "primary account number" or "PAN") that directly identifies a payment card account. In some embodiments, the proximity payment device 100 is personalized with a proxy or surrogate account number that does not, on its own, directly identify a payment card account. Instead, the proxy or surrogate account number (otherwise referred to, in the context of a MasterCard-branded payment card, as a "PayPass PAN" or "PPAN") is translated into a PAN (e.g., during a payment transaction by a payment network or an issuer) for use in completing a transaction.

The proximity payment device 302 may be issued to an account holder. In some embodiments, this may include sending the proximity payment device assembly 100 to the account holder. In some embodiments, sending may comprise mailing. In some embodiments, the entire proximity payment device assembly may be mailed, after personalization, to the account holder, who may then detach the subcard body from the assembly to realize a convenient fob-sized proximity payment device. In some embodiments, the device may then be placed in a holder for convenient carrying. In some embodiments, the holder may comprise a holder for convenient carrying on a key ring or key chain.

In some embodiments, the proximity payment device 302 may operate in a conventional manner. For example, in some embodiments, the proximity payment device may operate in accordance with the above-mentioned "PayPass" standard. In some embodiments, the proximity payment device 302 may be presented to a proximity coupling device (not shown) of a POS terminal (not shown) to accomplish payment for a sales transaction. The proximity coupling device may transmit an interrogation signal. The proximity payment device 302 may receive the interrogation signal via the antenna 306. The received interrogation signal may cause the RFID IC 304 to be powered-up. For example, the RFID IC 304 may rectify the received interrogation signal to generate a DC power level. The RFID IC 304 may transmit a signal to the proximity coupling device in response to the interrogation signal. The RFID IC 304 may transmit the signal (and possibly one or more additional signals) to the proximity coupling device via the antenna 306. One or more signals transmitted by the RFID IC 304 may include a payment card account number and/or other information required for interaction with the proximity coupling device. In some embodiments, possibly after a handshake procedure or the like, the RFID IC 304 may transmit the payment card account number and/or other information to the POS terminal via the antenna 306. The POS terminal may then interact with a payment card system to charge the current sales transaction to the payment card account represented by the payment card account number received from the proximity payment device 302.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, the proximity payment device 302 may be enabled at all times. In some other embodiments, the proximity payment device 302 may be enabled only at selected times. In some embodiments, a proximity payment device may be selectively enabled/disabled in order to enable and/or disable operation of the proximity payment device. In some embodiments, an input device may be provided to selectively enable operation of the proximity payment device 302. In some embodiments, a proximity payment device may be presented to a proximity coupling device before, during and/or after enabling operation of the proximity payment device.

The two embodiments shown in FIGS. 1 and 2 may be considered to have the subcard body at the right side of the plastic body. However, the subcard body can alternatively be provided at the left side of the plastic body. Indeed, the latter situation occurs, for example, if the plastic body is merely rotated around its right or left edge to bring the rear surface (not shown) of the plastic body into view. Similarly, in the case of the proximity payment device assembly 100a of FIG. 2, the detachable corner may be at the top rather than the bottom of the subcard body, and the latter situation occurs, for example, if the plastic body is rotated about its top or bottom edge to bring the rear surface of the plastic body into view.

The assemblies 100, 100a of FIGS. 1 and 2 may be fabricated in any manner.

Figure 6:
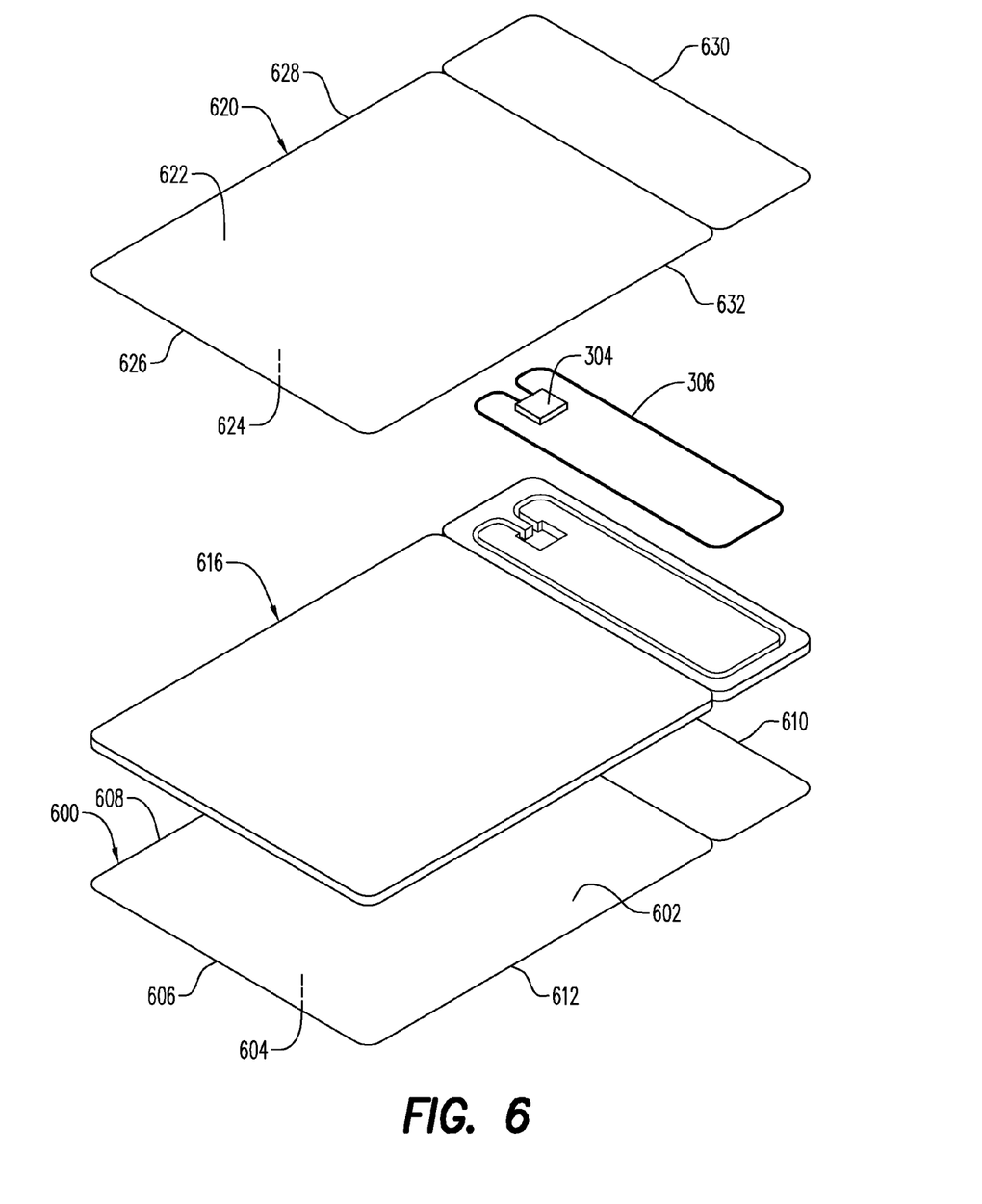
FIG. 6 shows a method for fabricating a proximity payment device assembly, in accordance with some embodiments.

FIG. 6 shows a method for fabricating the assembly 100, in accordance with some embodiments. Referring to FIG. 6, a first layer 600 may be provided. The first layer 600 may be card shaped with major outer surfaces 602, 604 and edges 606, 608, 610, 612. A central portion, indicated at 616 and sometimes referred to herein as an "inlay", may be disposed on one of the major outer surfaces 602, 604 of the first layer 600. The central portion 616 may include the antenna 306 and the RFID IC 304. A second layer 620 may be disposed on the central portion. As with the first layer 610, the second layer 620 may be card shaped with major outer surfaces 622, 624 and outer edges 626, 628, 630, 632. The outer edges 626, 628, 630, 632 of the second layer 620 may be disposed in register with the outer edges 606, 608, 610, 612 of the first layer 600.

Heat and/or pressure may be applied to the first layer 600 and/or the second layer 620. The heat and/or pressure may cause the first layer 600 and the second layer 620 to become bonded to one another so as to trap the antenna 306 and the RFID IC 304 therebetween. In some embodiments, the first layer 600 and the second layer 620 are each formed of plastic or other suitable material.

One or more portion of the first layer 600 and/or one or more portion of the second layer 620 may be removed by punching and/or scoring to define one or more portions of the periphery of the subcard body 122 and/or notches 124.

In some embodiments, the proximity payment device 100 may have a contact interface.

Figure 7A:
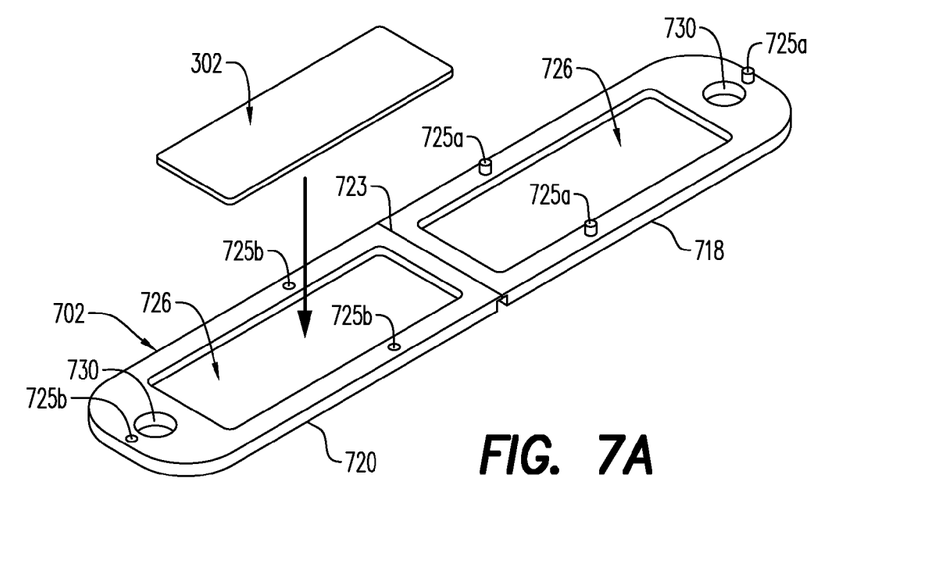
FIGS. 7A-7D are perspective views of a proximity payment device and a holder to receive the proximity payment device, according to some embodiments.
Figure 7B:
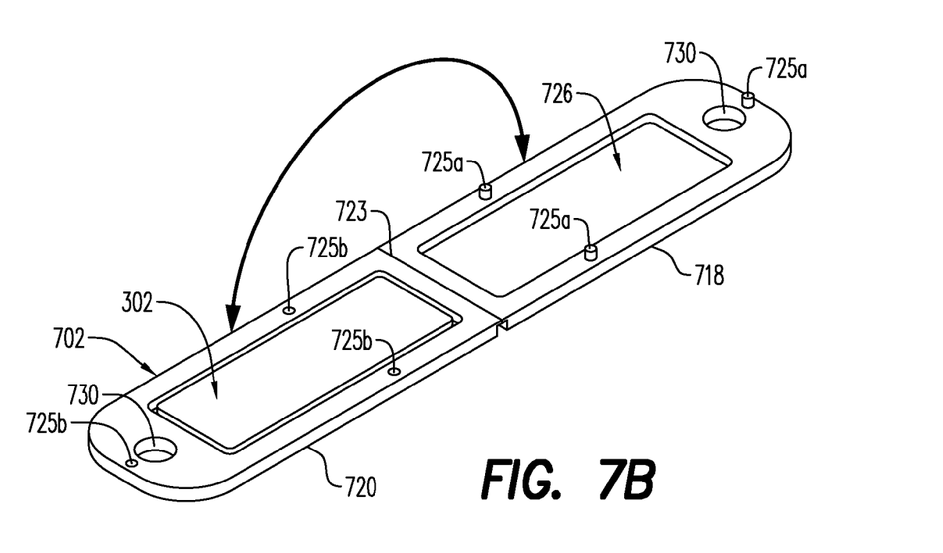
Figure 7C:
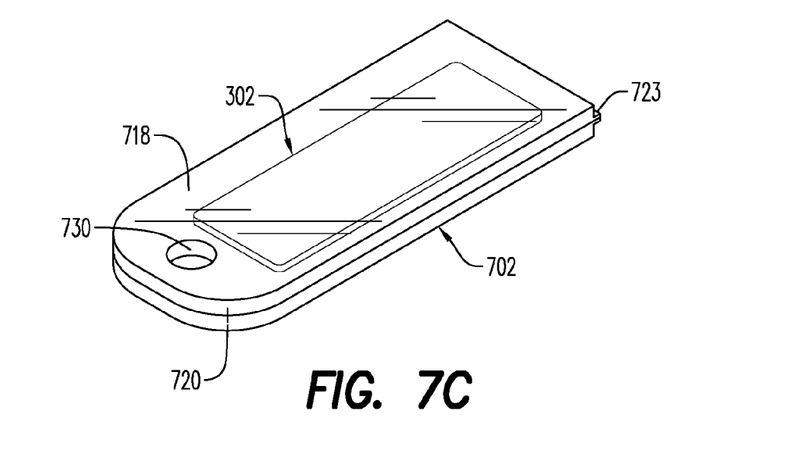
Figure 7D:
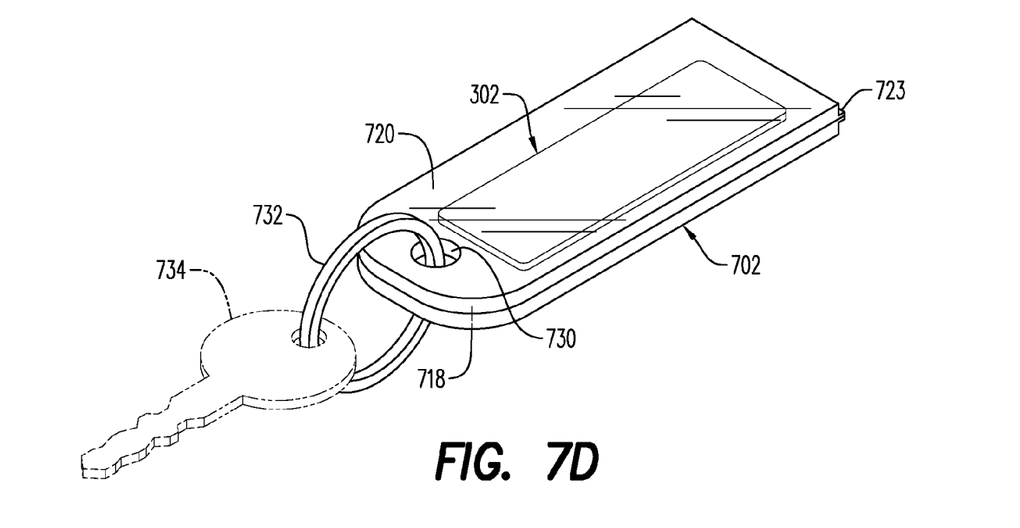

FIGS. 7A-7D are perspective views of the proximity payment device 302 and a holder to receive the proximity payment device 702, according to some embodiments. FIG. 7A is a perspective view of the proximity payment device 302 and the holder 702, according to some embodiments, with the holder 702 in an open state. FIG. 7B is a perspective view of the proximity payment device 302 installed in the holder 702, according to some embodiments, with the holder 702 in an open state. FIGS. 7C-7D are perspective views of the proximity payment device 302 installed in the holder 702, according to some embodiments, with the holder 702 in a closed state.

Referring to FIGS. 7A-7D, according to some embodiments, a holder 702 to receive a proximity payment device 302 may include a front portion 718, a back portion 720 and a portion 723 to retain a first side of the front portion 718 to a first side of the back portion 720 in a clamshell configuration. In some embodiments, the portion 723 may comprise a living hinge or other type of hinge that allows the portions 718, 720 to pivot relative to one another. In some embodiments, the portion 723 may be defined in part by scoring of the holder 702. In some embodiments, the portion 723 comprises material that is bendable and allows the portion 723 to be bent if the holder 702 is to be closed.

Figure 8A:
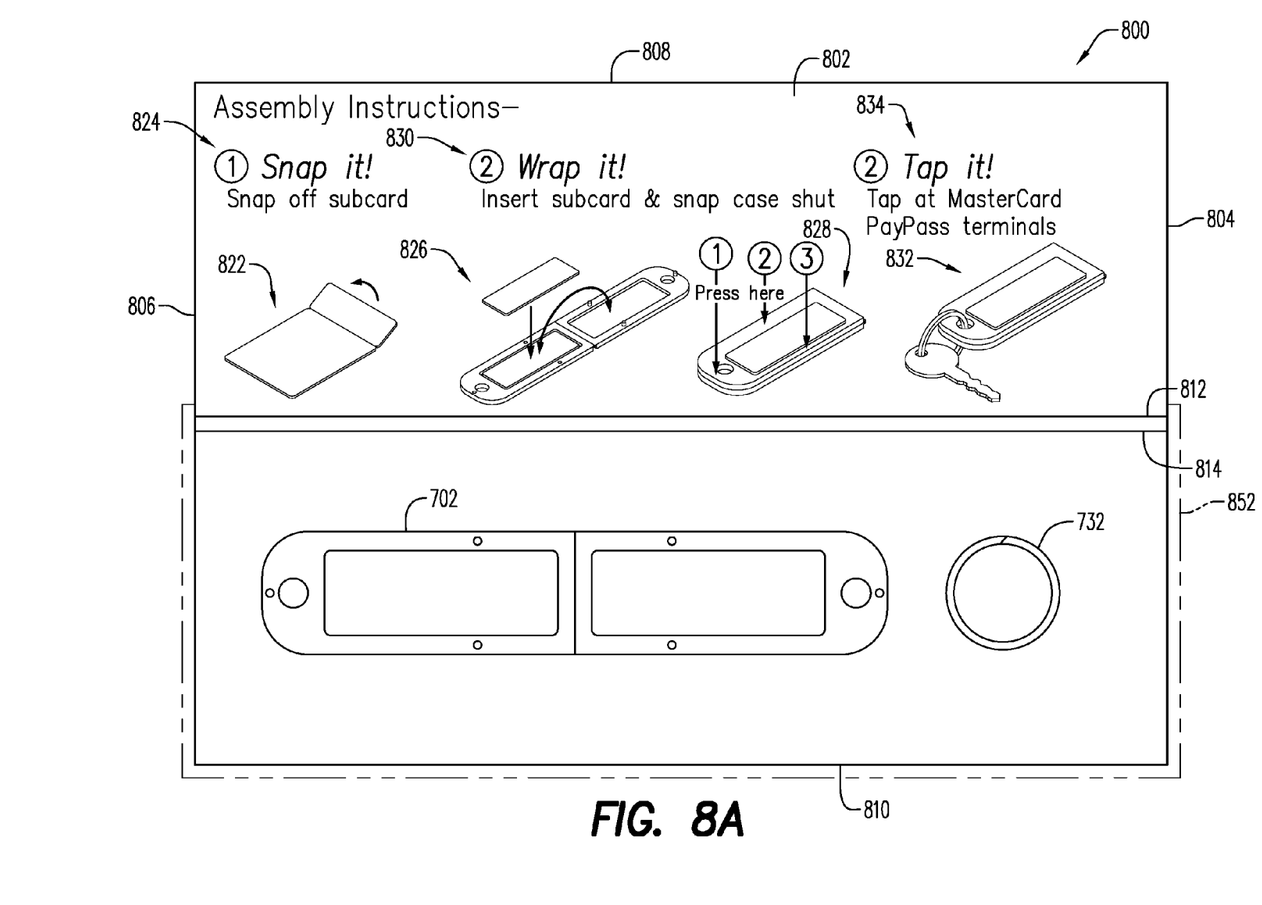
FIG. 8A is a top plan view of an assembly in a first state according to some embodiments.

The body 802 may be foldable along one or more fold lines 812, 814, and may be scored along such one or more fold lines 812, 814 to facilitate such folding.

A second side of the front portion 718 may be releasably retained to a second side of the back portion 720 by a releasable catch 725. In some embodiments, the releasable catch 725 comprises one or more pins 725a defined by one portion, e.g., front portion 718, and one or more sockets 725b defined by the other portion, e.g., back portion 720, adapted to receive the one or more pins 725a. In some embodiments the one or more pins and one or more sockets are sized so as to provide a press fit between the pins and sockets. In such embodiments, some amount of force may need to be applied to one or both portions 718, 720 to insert the one or more pins into the one or more sockets. Upon releasing the releasable catch 725, the second side the front portion 718 and the second side of the back portion 720 may be free to pivot away from one another.

The front portion 718 may have a shape that is the same as and/or similar to that of the back portion 720, such that, with the holder 702 in the closed state, the edge of the second side of the front portion 718 may be disposed in register with the edge of the second side of the back portion 720. The second side of the front portion and the second side of the back portion may each be rounded and/or define rounded corners.

Some or all of the front portion 718 and/or some or all of the back portion 720 may be substantially transparent to allow one or more portions of the proximity payment device 302 to be seen therethrough. In some embodiments, the holder 702 may be formed of plastic and/or other suitable material.

The holder 702 may define a seat 726 to receive the proximity payment device 302 and to support and/or position the proximity payment device 302, at least in part. In some embodiments, the seat 726 may have a length, a width and/or a height that is the same size as or slightly larger than the length, the width and/or the thickness, respectively, of the proximity payment device 302.

The holder 702 may define an opening 730 to receive a ring 732. The ring may comprise a key ring to receive and/or retain one or more keys 734. If the ring comprises a key ring, the holder 702 may be considered a type of key fob.

In some embodiments, the holder 702 may further include an electrical interface (not shown), which may include one or more contacts adapted to contact one or more of contacts of the RFID IC 304. In some embodiments, the holder 702 may further include a display, a power source and/or a controller. In some embodiments, the proximity payment device 302 may be adapted to be electrically connected to such display, power source and/or controller. In that regard, in some embodiments, the RFID IC 304 may include contacts, e.g., one or more of contacts 408-440, adapted to be connected to the display, power source and/or controller. Access to a source of electrical power may improve one or more operating characteristics of the proximity payment device 302. In some embodiments, access to a source of electrical power may give the proximity payment device a greater range. In some embodiments, access to a source of electrical power may allow the device to perform a greater number of functions and/or may increase the operating speed of the device.

The holder 702 may be issued to an account holder. In some embodiments, this may include mailing and/or otherwise sending the holder 702 to the account holder. In some embodiments, sending may comprise mailing.

FIG. 8A is a top plan view of an assembly 800, according to some embodiments. Referring to FIG. 8A, in accordance with some embodiments, the assembly 800 includes a body 802, the holder 702 and/or the ring 732 and may be mailed and/or otherwise sent to an account holder for use with the proximity payment device 302.

The body 802 may be generally flat and/or card shaped and may include a right edge 804, a left edge 806, a top edge 808 and a bottom edge 810. The body 802 may be formed of paper, cardboard, plastic and/or any other suitable material. In some embodiments, the body 802 may be foldable along one or more fold lines 812, 814. In some embodiments, the body may be scored along such one or more fold lines 812, 814 to facilitate such folding. In some embodiments, the body 802 may comprise material that is bendable and allows the body 802 to be bent at least in part.

The body 802 may have information printed and/or otherwise provided thereon. The information may include instructions and/or other information relating to use of the holder 702 and/or the proximity payment device 302. Some embodiments may include (i) a representation 822 of the assembly 100, (ii) instructions 824 for detaching the proximity payment device 302, (iii) a representation 826 of the proximity payment device 302 and the holder 702 with the holder in an open state, (iv) a representation 828 of the proximity payment device 302 installed in the holder 702 with the holder in a closed state, (v) instructions 830 for installing the proximity payment device 302 and closing the holder 702, (vi) a representation 832 of the proximity payment device 302 and the holder 702 with the key ring 732 retaining a key 734 and attached thereto and/or (vii) instructions 834 for using the proximity payment device 302 and holder 702.

Figure 8B:
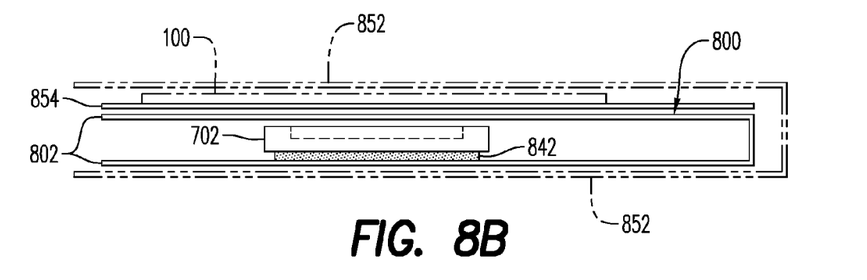
FIG. 8B is a schematic cross sectional view of an assembly in a second state according to some embodiments.

FIG. 8B is a schematic cross sectional view of the assembly 800 in folded state according to some embodiments. Referring to FIG. 8B, in some embodiments, adhesive 842 may be used to releasably attach the holder 702 and/or the ring 732 to the body 802. Such adhesive may comprise a pressure sensitive adhesive or other type of adhesive disposed between the holder 702 and the card 802 and disposed between the ring 732 and the body 802. The adhesive may retain the holder 702 and the key ring 732 to the body 802 until the holder 702 and/or the ring 732 are detached therefrom by manual action of a human being such as the account holder.

In some embodiments, the assembly 800 may have a length, a width and a thickness, in the folded state, that allow the assembly 800 to fit within an envelope indicated schematically at 852. In some embodiments, assembly 800 may fit within a number 10 envelope and/or an envelope of other size that facilitates the use of existing fulfillment equipment (e.g., existing equipment used to stuff envelopes and/or sort mail) and/or help reduce the cost of supplying the assembly 800 to an account holder.

In some embodiments, the assembly 800 may be mailed and/or otherwise sent to an account holder along with the assembly 100 (which may be releasably attached to a sheet of paper 854), so that the account holder is provided with the proximity payment device 302, the holder 702 and the ring 732.

In some embodiments, the assembly 100 and the assembly 800 define at least a portion of a kit. In accordance with some embodiments, the kit may further include an envelope 852 to receive the assembly 100 and assembly 800.

In some embodiments, the assembly 100, the assembly 800, the envelope 852 and any additional material within the envelope 852 may have a combined thickness that is less than one quarter of an inch. This may further help to facilitate the use of existing fulfillment equipment. In that regard, in some embodiments, the holder 702 has a thickness equal to 3.1 mm or about 3.1 mm. In some embodiments, the assembly 100 has a thickness equal to 0.8 mm or about 0.8 mm. In some embodiments, the use of a body 802 that is generally flat and/or card shaped may also help facilitate the use of existing fulfillment equipment.

After the account holder receives the assembly 100 and the assembly 800, the account holder may detach the proximity payment device 302 and the holder 702 from the assembly 100 and assembly 800, respectively. The proximity payment device 302 may then be placed in the holder 702 for convenient carrying. The ring 732 may be inserted into the opening 730. If the ring 732 comprises a key ring, such ring 732 may allow keys 734 to be retained to the holder 702.

Figure 8C:
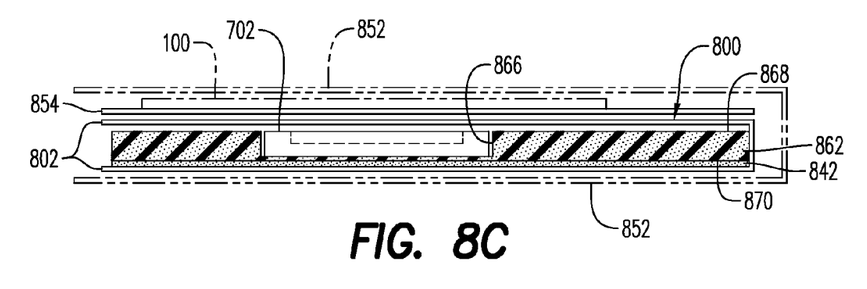
FIG. 8C is a schematic cross sectional view of an assembly in a second state according to some embodiments.

FIG. 8C is a schematic cross sectional view of the assembly 800 in folded state according to some embodiments. Referring to FIG. 8C, in some embodiments, the holder 702 and/or the ring 732 may be disposed in a carrier 862, which may be attached to the body 802 by adhesive 842 and/or other means. The presence of the carrier 862 may help provide the assembly 800 with a thickness that is more uniform across the assembly 800, which may help facilitate the use of existing equipment used to stuff envelopes and/or sort mail.

The carrier 862 may define a seat 866 to receive the holder 702 and may further define a seat to receive the ring 732. The carrier 862 may further define a first major outer 868 and a second major outer surface 870.

In some embodiments, the seat 866 may have a length, width and/or height that is the same as and/or similar to the length, width and/or thickness, respectively, of the holder 702. In some embodiments, the carrier 862 may comprise expanded foam and/or other flexible material that allows the holder 702 and/or ring 732 to be press fit into the seat 866 so as to releasably attach the holder 702 and/or ring 732 to the carrier 862 and/or card 802. In such embodiments, the seat 866 may have a length and/or a width that is slightly smaller than the length and/or width, respectively, of the holder 702. In some embodiments, the seat 866 may have a height that is equal to or about equal to the thickness of the holder 702 such that the surface of the holder 702 is flush with the surface 866 of the carrier. This may further facilitate the use of existing equipment used to stuff envelopes. In some embodiments, the carrier 862 may itself have a substantially uniform thickness.

Figure 8D:
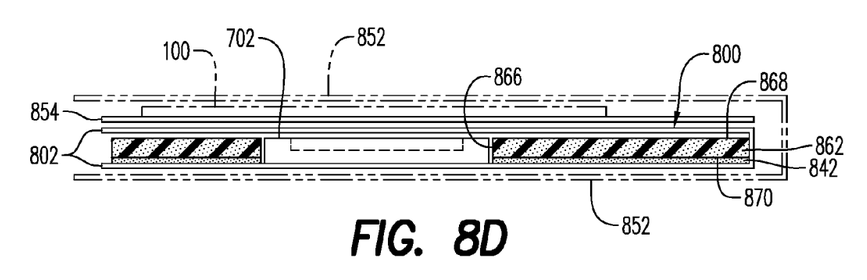
FIG. 8D is a schematic cross sectional view of an assembly in a second state according to some embodiments.

In some embodiments, the seat 866 extends completely through the carrier 862. FIG. 8D is a schematic cross sectional view of an assembly 800 that includes a carrier 862 defining a seat 866 that extends completely through the carrier 862. In some embodiments, such a design may make it possible to form the seat 866 using punching.

Other configurations may also be employed.

In some embodiments, one or more portions of one or more embodiments disclosed herein may be embodied in an assembly, an apparatus, a kit and/or a method.

As used herein and in the appended claims, "proximity payment device" refers to any device, of any shape, which transmits to a point of sale terminal, by wireless transmission, a payment account number and/or payment account identifier.

The principles taught herein have heretofore been described in the context of proximity payment devices. Nevertheless, these teachings are also applicable to any type of identification token. As used herein, the term "identification token" refers to a device, of any shape, that serves as one or more of a proximity payment device, a transportation related device, an identification device, an RFID-enabled passport and/or a source of any type of information associated with a holder of the identification token (and/or the holder of the card installed therein). The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

Thus, in accordance with some embodiments, information other than a payment card account number (or portion thereof) may be stored in the RFID IC 304. In some embodiments, the information may comprise one or more portions of a name, a social security number, an account number, an expiration date, a security code and/or medical information.

The above description and/or the accompanying drawings are not meant to be limited to a fixed order or sequence of steps for any process referred to herein; rather any process may be performed in any order that is practicable, including but not limited to simultaneous performance of steps indicated as sequential.

Unless stated otherwise, a wireless communication interface may be any type of wireless communication interface.

Also, unless stated otherwise, a signal may be any type of signal, i.e., an analog signal, a digital signal, a single ended signal, a differential signal and/or any other type of signal or combination thereof.

In addition, unless stated otherwise, a circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

In accordance with some embodiments, the proximity payment device 100 described herein may be considered a type of contactless smart card. The teachings of this application are thus applicable to contactless smart cards generally, as well as to so-called "dual interface" smart cards, which contain a set of contacts on a surface of the card to allow for direct contact interface to a terminal. "Dual interface" smart cards also include an antenna to allow for interfacing to a terminal by wireless transmission of signals.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An identification token assembly, comprising:
a card-shaped plastic body having a first edge and a second edge, said plastic body having a scored line formed therein, the plastic body including a subcard body extending from the first edge of the plastic body to the second edge of the plastic body, the scored line adapted to allow the subcard body to be manually snapped off from the plastic body;
a radio frequency identification (RFID) integrated circuit (IC) supported by the subcard body; and
an antenna supported by the subcard body and coupled to the RFID IC to transmit a signal generated by the RFID IC;
wherein the plastic body comprises a generally rectangular card-shaped plastic body having a right edge and a left edge parallel to the right edge, said first edge comprising a top edge, said second edge comprising a bottom edge parallel to said top edge, said top and bottom edges oriented generally perpendicular to said left and right edges, said top edge and said left edge are joined by a top left rounded corner, said bottom edge and said left edge are joined by a bottom left rounded corner, said top edge and said right edge are joined by a top right rounded corner, said bottom edge and said right edge are joined by a bottom right rounded corner, the plastic body has a first notch formed in the top edge at a locus of the scored line and wherein the plastic body has a second notch, said second notch formed in the bottom edge at the locus of the scored line, the first notch is defined between two convex quarter-circle radii, the second notch is defined between two convex quarter-circle radii, the RFID IC is embedded in the subcard body and the antenna is embedded in the subcard body;
wherein the plastic body comprises a length dimension and a height dimension, the height dimension of the plastic body is substantially 54 mm and the length dimension of the plastic body is substantially 85.6 mm; and
wherein said scored line is a first scored line, and said plastic body has a second scored line, said second scored line being formed in said subcard body, said second scored line adjacent said lower right corner to define a detachable corner portion of said subcard body, said second scored line adapted to allow the detachable corner portion to be manually snapped off from the subcard body, the plastic body having a third notch, the third notch formed in the right edge at the locus of the second scored line, the third notch defined between two convex radii that are different in angular extent from each other, the plastic body having a fourth notch, the fourth notch formed in said bottom edge between said second notch and said bottom right corner of said plastic body, the fourth notch defined between two convex radii that are different in angular extent from each other; the third and fourth notches both being voids in the right and bottom edges, respectively; the second scored line extending to reach from the third notch to the fourth notch.

2. The identification token assembly of claim 1, wherein the first scored line is substantially 30 mm from said right edge, such that said subcard body has dimensions of substantially 54 mm by 30 mm.

3. A proximity payment device assembly, comprising:
a generally rectangular card-shaped plastic body having a length dimension and a height dimension, said plastic body having a right edge, a left edge parallel to the right edge, a top edge and a bottom edge parallel to said top edge, said top and bottom edges oriented generally perpendicular to said left and right edges, said top edge and said left edge joined by a top left rounded corner, said bottom edge and said left edge joined by a bottom left rounded corner, said top edge and said right edge joined by a top right rounded corner, said bottom edge and said right edge joined by a bottom right rounded corner, said plastic body having a scored line formed therein to define a subcard body as a portion of the plastic body, the scored line parallel to said right and left edges and adapted to allow the subcard body to be manually snapped off from the plastic body, the plastic body having a first notch formed in the top edge at a locus of the scored line, the first notch defined between two convex quarter-circle radii, the plastic body having a second notch, said second notch formed in the bottom edge at the locus of the scored line, the second notch defined between two convex quarter-circle radii; the first and second notches both being voids in the top and bottom edges, respectively; the scored line extending across the height dimension of the plastic body to reach from the first notch to the second notch;
a radio frequency identification (RFID) integrated circuit (IC) embedded in the subcard body; and
an antenna embedded in the subcard body and coupled to the RFID IC to transmit a signal generated by the RFID IC;
wherein the height dimension of the plastic body is substantially 54 mm and the length dimension of the plastic body is substantially 85.6 mm; and
wherein said scored line is a first scored line, and said plastic body has a second scored line, said second scored line being formed in said subcard body, said second scored line adjacent said lower right corner to define a detachable corner portion of said subcard body, said second scored line adapted to allow the detachable corner portion to be manually snapped off from the subcard body, the plastic body having a third notch, the third notch formed in the right edge at the locus of the second scored line, the third notch defined between two convex radii that are different in angular extent from each other, the plastic body having a fourth notch, the fourth notch formed in said bottom edge between said second notch and said bottom right corner of said plastic body, the fourth notch defined between two convex radii that are different in angular extent from each other; the third and fourth notches both being voids in the right and bottom edges, respectively; the second scored line extending to reach from the third notch to the fourth notch.

4. The proximity payment device assembly of claim 3, wherein the first scored line is substantially 30 mm from said right edge, such that said subcard body has dimensions of substantially 54 mm by 30 mm.

5. The proximity payment device assembly of claim 3, wherein said second scored line is oriented at 45° relative to said right and bottom edges.

* * * * *